United States Patent
Subramanian

(10) Patent No.: US 12,179,585 B2
(45) Date of Patent: Dec. 31, 2024

(54) ADJUSTING A TORQUE APPLIED TO A WHEEL OF A VEHICLE

(71) Applicant: Volvo Truck Corporation, Gothenburg (SE)

(72) Inventor: Chidambaram Subramanian, Jamestown, NC (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/538,062

(22) Filed: Dec. 13, 2023

(65) Prior Publication Data
US 2024/0198795 A1    Jun. 20, 2024

(30) Foreign Application Priority Data
Dec. 14, 2022 (EP) .................................. 22213438

(51) Int. Cl.
*B60W 30/18* (2012.01)
*B60K 17/22* (2006.01)
(Continued)

(52) U.S. Cl.
CPC .......... *B60K 23/0808* (2013.01); *B60K 17/22* (2013.01); *B60K 17/36* (2013.01);
(Continued)

(58) Field of Classification Search
CPC ....... B60W 30/18172; B60W 2520/10; B60W 2520/26; B60W 2520/28; B60W 2520/30; B60W 2720/26; B60W 2720/28; B60W 2720/30; B60W 2710/0666; B60W 30/188; B60W 2300/145; B60W 2300/14; B60W 2300/12; B60W 2300/123; B60W 2300/125; B60W 2300/13; B60K 23/0808; B60K 17/22; B60K 17/26; B60K 28/16;
(Continued)

(56) References Cited

U.S. PATENT DOCUMENTS

| | | | |
|---|---|---|---|
| 5,860,889 A | | 1/1999 | Schlosser et al. |
| 6,015,019 A | * | 1/2000 | Grimes ................... B60K 17/28 |
| | | | 180/324 |

(Continued)

FOREIGN PATENT DOCUMENTS

WO    2014195021 A1    12/2014

OTHER PUBLICATIONS

1 Extended European Search Report for European Patent Application No. 22213438.9, mailed May 10, 2023, 6 pages.

*Primary Examiner* — Tinh Dang
(74) *Attorney, Agent, or Firm* — Sage Patent Group

(57) ABSTRACT

A computer system including a processor device configured to adjust a torque applies to a first wheel to a vehicle is provided. The processor device is configured to estimate, a variation in rotational speed of a first drive shaft. The first drive shaft is driven by a second drive shaft by rotating a mechanical joint. The mechanical joint is drivingly connected to both the first drive shaft and the second drive shaft. The processor device is configured to, based on the variation in rotational speed of the first drive shaft and a current speed of the vehicle, estimate a target slip for the first wheel. The processor device is further configured to, based on the estimated target slip for the first wheel, adjust the torque applied to the first wheel.

15 Claims, 4 Drawing Sheets

(51) Int. Cl.
    *B60K 17/36*       (2006.01)
    *B60K 23/08*       (2006.01)
    *B60K 28/16*       (2006.01)
    *B60W 30/188*     (2012.01)

(52) U.S. Cl.
    CPC ... *B60W 30/18172* (2013.01); *B60W 2520/10* (2013.01); *B60W 2520/26* (2013.01); *B60W 2520/28* (2013.01); *B60W 2520/30* (2013.01); *B60W 2720/26* (2013.01); *B60W 2720/28* (2013.01); *B60W 2720/30* (2013.01)

(58) Field of Classification Search
    CPC ...... B60T 8/175; B60T 8/248; B60T 2230/06; B60T 2230/02
    See application file for complete search history.

(56) References Cited

U.S. PATENT DOCUMENTS

| | | | |
|---|---|---|---|
| 6,754,943 B1 * | 6/2004 | Perry | B23P 11/00 |
| | | | 29/421.1 |
| 2002/0179357 A1 | 12/2002 | Gady et al. | |
| 2003/0183439 A1 * | 10/2003 | Penzotti | B60K 17/22 |
| | | | 180/379 |
| 2016/0116062 A1 * | 4/2016 | Hedman | F16H 57/0494 |
| | | | 701/51 |

\* cited by examiner

ADJUSTING A TORQUE APPLIED TO A WHEEL OF A VEHICLE

CROSS REFERENCE TO RELATED APPLICATION

This application claims foreign priority to European Application No. 22213438.9 filed on Dec. 14, 2022, the disclosure and content of which is incorporated by reference herein in its entirety.

TECHNICAL FIELD

The disclosure relates generally to handling wheel slip. In particular aspects, the disclosure relates to adjusting torque applied to a wheel of a vehicle. The disclosure can be applied in heavy-duty vehicles, such as trucks, buses, and construction equipment. Although the disclosure may be described with respect to a particular vehicle, the disclosure is not restricted to any particular vehicle.

BACKGROUND

A longitudinal wheel slip in a wheel of a vehicle is when the rotational speed of the wheel is not matched with the speed of the vehicle. When the longitudinal wheel slip is too great and/or performed over an extended period of time, this may cause an instability of the vehicle and/or may affect the traction of the vehicle negatively. To ensure that the vehicle can be stable and have enough traction, a torque compensation can be applied to the wheel with respect to a target wheel slip estimated based on the difference in rotational speed of the wheel and a speed of the vehicle. While this compensation may be effective, it can take considerable time for the wheel slip to be low enough to optimally control the stability and/or traction of the vehicle.

Hence, there is an ongoing strive to improve handling of wheel slip in vehicles.

SUMMARY

According to a first aspect of the disclosure, a computer system comprising a processor device configured to adjust a torque applied to a first wheel of a vehicle is provided. The first wheel is comprised in a first axle drivingly connected to a first drive shaft. The first drive shaft is configured to be driven by applying a torque to a second drive shaft. The second drive shaft rotates a mechanical joint based on the applied torque. The mechanical joint is drivingly connected to both the first drive shaft and the second drive shaft. The first drive shaft is angled at a first angle to the mechanical joint. The second drive shaft is angled at a second angle to the mechanical joint.

The processor device is configured to estimate, for a predetermined time period, a variation in rotational speed of the first drive shaft. The variation in rotational speed of the first drive shaft is caused at least partially by the first angle and the second angle. The variation in rotational speed of the first drive shaft being caused at least partially by the first angle and the second angle is a property of the mechanical joint being drivingly connected to both the first drive shaft and the second drive shaft at the respective first and second angle.

The processor device is further configured to, in response to obtaining an indication to adjust a slip of the first wheel, estimate a target slip for the first wheel based on the estimated variation in rotational speed of the first drive shaft and a current speed of the vehicle.

The processor device is further configured to, based on the estimated target slip for the first wheel, adjust the torque applied to the first wheel by issuing or adjusting a torque request for a torque to be applied to the second drive shaft.

The first aspect of the disclosure may respectively seek to improve handling of wheel slip in a vehicle. A technical benefit may include a more efficient wheel slip handling, thus improving traction and/or stability of the vehicle. This since the estimated target slip is estimated based on the variation in rotational speed of the first drive shaft. The variation in rotational speed of the first drive shaft proportionally affects the rotational speed of the first wheel such that it also varies with the rotational wheel of the first drive shaft. This means that the slip of the first wheel will also vary based on the rotational speed of the first drive shaft, and hence, accounting for said variation when adjusting the torque applied to the first wheel improves the handling of wheel slip of the first wheel. In particular, accounting for said variation in rotational speed means that the slip of the first wheel can be reduced much faster compared to assuming that there is no variation in rotational speed of the first drive shaft.

According to a second aspect of the disclosure, a computer-implemented method for adjusting a torque applied to a first wheel of a vehicle is provided. The first wheel is comprised in a first axle drivingly connected to a first drive shaft. The first drive shaft is configured to be driven by applying a torque to a second drive shaft. The second drive shaft rotates a mechanical joint based on the applied torque. The mechanical joint is drivingly connected to both the first drive shaft and the second drive shaft. The first drive shaft is angled at a first angle to the mechanical joint. The second drive shaft is angled at a second angle to the mechanical joint.

The method comprises, by a processor device of a computer system, estimating, for a predetermined time period, a variation in rotational speed of the first drive shaft. The variation in rotational speed of the first drive shaft is caused at least partially by the first angle and the second angle. The variation in rotational speed of the first drive shaft being caused at least partially by the first angle and the second angle is a property of the mechanical joint being drivingly connected to both the first drive shaft and the second drive shaft.

The method further comprises, by the processor device, in response to obtaining an indication to adjust a slip of the first wheel, based on the estimated variation in rotational speed of the first drive shaft and a current speed of the vehicle, estimating a target slip for the first wheel.

The method further comprises, based on the estimated target slip for the first wheel, adjusting the torque applied to the first wheel by issuing or adjusting a torque request for a torque to be applied to the second drive shaft.

The second aspect of the disclosure may respectively seek to improve handling of wheel slip in a vehicle. A technical benefit may include a more efficient wheel slip handling, thus improving traction and/or stability of the vehicle. This since the estimated target slip is estimated based on the variation in rotational speed of the first drive shaft. The variation in rotational speed of the first drive shaft proportionally affects the rotational speed of the first wheel such that it also varies with the rotational wheel of the first drive shaft. This means that the slip of the first wheel will also vary based on the rotational speed of the first drive shaft, and hence, accounting for said variation when adjusting the torque applied to the first wheel improves the handling of wheel slip of the first wheel. In particular, accounting for said variation in rotational speed means that the slip of the first wheel can be reduced much faster compared to assuming that there is no variation in rotational speed of the first drive shaft.

In some examples, obtaining the variation in rotational speed of the first drive shaft comprises obtaining the variation in rotational speed for the predetermined time period from a rotation sensor arranged to measure the rotational speed of the first drive shaft.

In this way, the target slip of the first wheel can be accurately estimated to account for the variation of rotational speed in the first drive shaft.

In some examples, obtaining the variation in rotational speed of the first drive shaft comprises obtaining from at least one angle sensor, the first angle and the second angle. In these examples, the method may further comprise estimating the variation in rotational speed of the first drive shaft based on the first angle and the second angle.

In this way, the target slip of the first wheel can be accurately estimated to account for the variation of rotational speed in the first drive shaft by the use of an angle sensor. The angle sensor may be cheap and more flexible to mount to the vehicle and can be easily replaced if damaged. The variation in rotational speed is a property of the mechanical joint being drivingly connected to both the first drive shaft and the second drive shaft at the first and second angle. Hence, the variation in rotational speed may be estimated using said first angle and the second angle, e.g., using heuristics, based on a predefined model, or using a lookup table, etc.

In some examples, obtaining the variation in rotational speed of the first drive shaft comprises obtaining a ride height of the first axle, and obtaining a ride height of a second axle. The ride height of the first axle at least partly determines the first angle, and the ride height of the second axle at least partly determines the second angle.

In other words, the ride height of the respective first and second axle corresponds to the first and second angle, and thereby, the variation in rotational speed of the first drive shaft corresponds to the ride height of the respective first and second axle. In these examples, the method may further comprise estimating the variation in rotational speed of the first drive shaft based on the difference in ride height between the first axle and the second axle.

In this way, the target slip of the first wheel can be accurately estimated to account for the variation of rotational speed in the first drive shaft by the use of the difference in ride height between the first axle and the second axle. The difference in ride height may be obtained by sensors provided in the vehicle for measuring suspension. The difference in ride height is another way to represent the first and the second angle, and hence the variation in rotational speed is directly controlled by the difference in ride height. Hence, the variation in rotational speed may be estimated using said difference in ride height, e.g., using heuristics, a lookup table, etc.

In some examples, obtaining the variation in rotational speed of the first drive shaft comprises obtaining a first wheel speed of the first wheel of the first axle, and obtaining a second wheel speed of a second wheel of a second axle. In these examples, the method further comprises estimating the variation in rotational speed of the first drive shaft by comparing the first wheel speed and the second wheel speed during the predetermined time period.

In this way, the slip of the first wheel can be accurately estimated to account for the variation of rotational speed in the first drive shaft by the use of the difference in wheel speeds of the first wheel and the second wheel. Wheel speed as used herein may be the respective rotational speed of the respective first and second wheel. The comparison of the first wheel speed and the second wheel speed during the predetermined time period may be mapped to the variation in rotational speed of the first drive shaft, e.g., based on heuristics and/or a predefined model, such as a machine learning model. Such a predefined model and/or machine learning model may be trained using the wheel speeds of the first wheel and the second wheel combined with a value for the variation in rotational speed of the first drive shaft as a ground truth, e.g., by using a drive shaft sensor measuring the first drive shafts rotational speed and/or variation in rotational speed during a training phase of the predefined model and/or machine learning model.

In some examples, obtaining the variation in rotational speed of the first drive shaft comprises predicting a variation in rotational speed of the first drive shaft by using a predetermined statistical model modelling the rotational speed of the first drive shaft, and as an input to the predetermined statistical model, any one or more out of the following one or more parameters are provided:
    an indication of a current requested and/or applied throttle parameter of the vehicle,
    an indication of a current requested and/or applied brake parameter of the vehicle,
    an indication of a current requested and/or applied speed parameter of the vehicle,
    an indication of a current requested and/or applied suspension parameter of the vehicle, and
    an indication of loads applied to the first axle and/or the second axle of the vehicle.

In this way, the slip of the first wheel can be accurately handled to account for the variation of rotational speed in the first drive shaft by the use of a flexible range of parameters. The above mentioned one or more parameters may for example determine at least partly a longitudinal motion of the vehicle, which in combination or individually, may indicate the ride height difference of the first axle and the second axle, which thus, by the use of the predetermined statistical model, makes the variation in rotational speed of the first drive shaft derivable from the one or more parameters. The predetermined statistical model may be a machine learning model trained using one or more training parameters combined with a value for the variation in rotational speed of the first drive shaft as a ground truth, e.g., by using a drive shaft sensor measuring the first drive shafts rotational speed and/or variation in rotational speed during a training phase.

In some examples, adjusting the torque applied to the first wheel by issuing or adjusting a torque request for a torque to be applied to the second drive shaft comprises, based on the estimated target slip for the first wheel, determining a required rotational speed of the second drive shaft. In these examples, determining the required rotational speed of the second drive shaft is based on any one or more out of:
    the estimated variation in rotational speed of the first drive shaft, and
    the first angle and the second angle.

In these examples, issuing or adjusting the torque request for the torque to be applied to the second drive shaft is based on converting the required rotational speed of the second drive shaft to the torque to be issued or adjusted for the second drive shaft.

In this way, the required rotational speed of the second drive shaft can be supplied to meet the estimated target slip. In other words, the torque of the second drive shaft can be issued or adjusted such that to account for the variation in rotational speed of the first drive shaft.

In some examples, estimating the target slip for the first wheel comprises obtaining a current rotational speed of the first wheel, and obtaining the current speed of the vehicle. In some of these examples, estimating the target slip for the first wheel further comprises estimating a linear target slip based at least partly on a comparison of the current rotational speed of the first wheel and the speed of the vehicle. The linear target slip may be estimated in any suitable manner while assuming no variation in rotational speed in the first drive shaft. In some of these examples, estimating the target slip for the first wheel further comprises estimating the target slip by adjusting the linear target slip based on the estimated variation in rotational speed of the first wheel.

In some examples, adjusting the torque applied to the first wheel by issuing or adjusting the torque request for the torque to be applied to the second drive shaft comprises iteratively estimating a target slip for the first wheel based on the variation in rotational speed and a speed of the vehicle, and adjusting the torque applied to the first wheel by issuing or adjusting the torque request to the second drive shaft based on the iteratively estimated target slip until the iteratively estimated target slip is below a threshold and/or until detecting that a condition associated with the obtained indication has ceased.

In this way, the estimated target slip will faster converge to be below the threshold, or the condition associated with the obtained indication will faster cease. This is since the method will iteratively try to control the slip of the first wheel, and account for the variation in rotational speed.

In some examples, the obtained indication indicates any one or more out of:
to initiate a stability control procedure,
to initiate a traction control procedure,
to initiate an auxiliary brake control procedure.

In this way, the slip of the first wheel can be accurately handled to account for the variation of rotational speed in the first drive shaft in a flexible manner for any suitable control procedure benefiting from a low slip in the first wheel.

All embodiments and/or examples of the second aspect are applicable to and combinable with all embodiments and/or examples of the first aspect, and vice versa. In a corresponding manner, all advantages of the second aspect also apply to the first aspect, and vice versa.

According to a third aspect of the disclosure, a vehicle comprising a processor device to perform the method according to the second aspect is provided.

According to a fourth aspect of the disclosure, a computer program product is provided. The computer program product comprises program code for performing, when executed by the processor device, the method according to the second aspect.

According to a fifth aspect of the disclosure, a control system comprising one or more control units configured to perform the method according to the second aspect is provided.

According to a sixth aspect of the disclosure, a non-transitory computer-readable storage medium is provided. The computer-readable storage medium comprises instructions, which when executed by the processor device, cause the processor device to perform the method according to the second aspect.

Technical benefits of the third, fourth, fifth, and sixth aspects may respectively correspond to the technical benefits of the first and/or second aspects.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
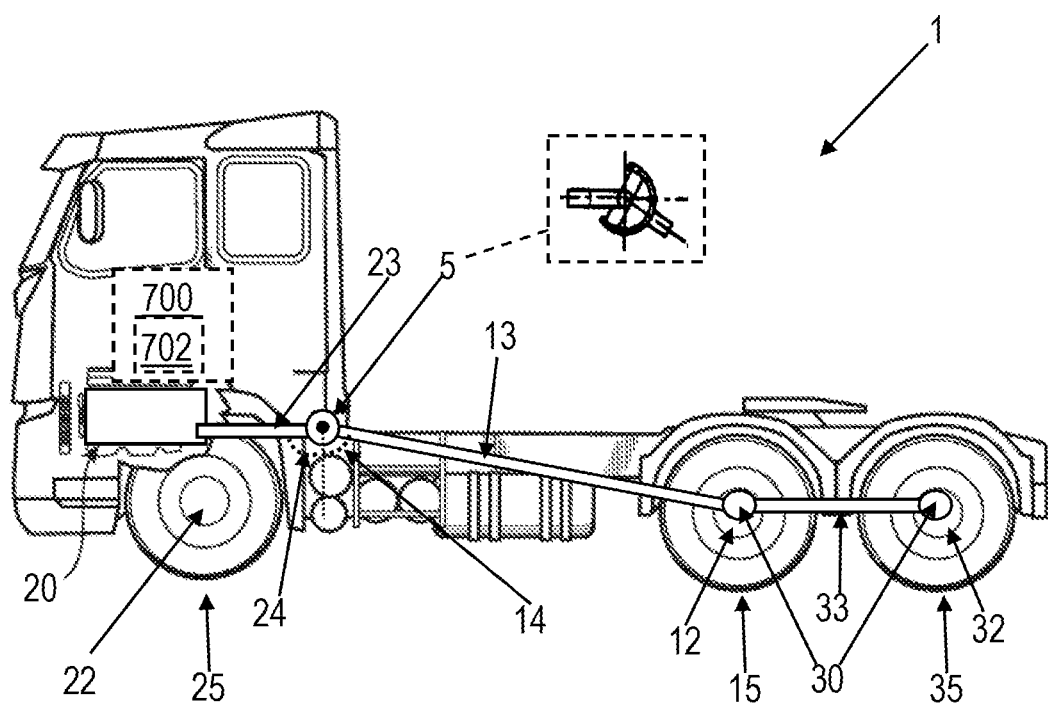
FIG. 1 illustrates a vehicle according to one example.

FIG. 1 is an exemplary system diagram of a vehicle 1 according to one example.

The vehicle 1 may be a manually driven vehicle, a remotely driven vehicle, or an at least partly autonomous vehicle. The vehicle 1 may be capable of driving under a cruise control configuration, e.g., wherein the vehicle 1 is configured to maintain a vehicle speed.

The vehicle 1 may comprise any suitable vehicle, e.g., one or more of a car, bus, heavy-duty vehicle, truck, construction equipment, etc.

The vehicle 1 comprises one or more axles, such as a first axle 12 e.g., a middle axle or a rear axle, and a second axle 22, e.g., a front axle, and optionally a third axle 32, e.g., a rear axle.

The vehicle 1 may comprise any suitable number of axles. Dimensions of the first axle 12 and/or the second axle 22 may be predefined, e.g., length, width, shape, etc.

The first axle 12 may comprise a first wheel 15. The second axle 22 may comprise a second wheel 25. The third axle 32 may comprise a third wheel 35.

The vehicle 1 comprises one or more drive shafts, such as a first drive shaft 13 and a second drive shaft 23. A drive shaft as used herein may also be referred to as a propeller shaft. The second drive shaft 23 may be rotated, i.e. driven, by a transmission arrangement 20, e.g., comprising an engine or motor driving the second drive shaft 23.

The transmission arrangement 20 which drives the second drive shaft 23 may be carried by the second axle 22. I.e., a ride height of the second axle 22 may determine a height of the transmission arrangement 20 and a height of an endpoint of the second drive shaft 23 which may be connected to, and driven by, the transmission arrangement 20.

The first drive shaft 13 is driven by the second drive shaft 23 by the second drive shaft 23 rotating a mechanical joint 5 connected to both the first drive shaft 13 and the second drive shaft 23. In other words, when the second drive shaft 23 is rotated, e.g., by the transmission arrangement 20, the torque of the second drive shaft 23 rotates the mechanical joint 5 and the first drive shaft 13. As an example, the mechanical joint 5 is illustrated as a universal joint in the dashed box of FIG. 1. Dimensions of the mechanical joint 5 may be predefined, e.g., length, width, shape, etc.

When the second drive shaft 23 rotates the mechanical joint 5, the first drive shaft 13 is rotated by the mechanical joint 5. The rotational speed of the first drive shaft 13 has a variation over a period of time due to a property of the mechanical joint 5 which causes the rotational speed of the first drive shaft 13 to have a variation based on an angle between the second drive shaft 23 and the mechanical joint 5 and/or the first drive shaft 13. In other words, the property of the mechanical joint 5 may cause the first drive shaft 13 to have a rotation that varies over a time period, even if the second drive shaft 23 rotates with a constant rotational speed.

The mechanical joint 5 may be a universal joint or similar joint which manifests the above-mentioned property, i.e. the mechanical joint 5 is not a 'constant-velocity' joint. The types of joints which manifests the above-mentioned property of the mechanical joint 5, e.g., universal joints, are cheaper, more durable, and more commonly found in heavy-duty vehicles such as in the vehicle 1.

The variation in rotational speed of the first drive shaft 13 is determined based on a total angle between the first drive shaft 13 and the second drive shaft 23 with respect to the mechanical joint 5. The first drive shaft 13 has a first angle 14 to the mechanical joint 5. The second drive shaft 23 has a second angle 24 to the mechanical joint 5. The total angle between the first drive shaft 13 and the second drive shaft 23 may be the sum of the first angle 14 and the second angle 24.

When a ride height of the first axle 12 and/or the second axle 22, or any other indication thereof can be obtained, then the first angle 14 and/or the second angle 24 may be determined by the ride height of the first axle 12 and/or the second axle 22. The ride height of the second axle 22 may be fixed, e.g., when the vehicle 1 is under cruise control.

The first drive shaft 13 may in some examples drive, i.e. rotate, a third drive shaft 33, i.e., for driving the third wheel 35 of the third axle 32. The first drive shaft 13 may drive the third drive shaft 33, e.g., using a mechanical joint such as a universal joint, e.g., similar to the mechanical joint 5.

The vehicle 1 may further comprise differential carriers 30, e.g., comprised in the first axle 12 and/or in the third axle 32, e.g., for converting a rotation of the first drive shaft 13 and/or the rotation of the third drive shaft 33 into a rotation in the first wheel 15 and/or the third wheel 35.

Exemplary embodiments herein may relate to adjusting a torque applied to the first wheel 15 of the vehicle 1. To perform this, exemplary embodiments herein comprises estimating, for a predetermined time period, a variation in rotational speed of the first drive shaft 13, and further estimating a target slip based on the estimated variation in rotational speed of the first drive shaft 13 and a current speed of the vehicle, and adjusting the torque applied to the first wheel 15 based on the estimated target slip for the first wheel 15.

The variation in the rotational speed of the first drive shaft 13 may be determined or estimated in any suitable manner. Typically the rotational speed of the first drive shaft 13 may utilize that, due to the property of the mechanical joint 5, the first angle 14 and the second angle 24 may be mapped to the variation in rotational speed of the first drive shaft 13. In a corresponding manner, additionally or alternatively, a difference in ride height, and/or using the first axle 12 and/or the second axle 22 may be mapped to the variation in rotational speed of the first drive shaft 13.

Some examples and embodiments herein may further comprise estimating a target slip of the third wheel 35 on the third axle 32 based on the rotational variation of the third drive shaft 33 and e.g., based on an obtained ride height of the first axle 12, and further adjust a torque applied to the third wheel 35. In other words, all exemplary embodiments herein may also apply to the third wheel 35 being driven by the third axle 33.

The vehicle 1 may be equipped with any one or more sensors (not shown) suitable for measuring, estimating and/or determining any one or more parameters and/or one or more values necessary to perform examples and/or embodiments herein.

The vehicle 1 may for example comprise any one or more out of:
- at least one alternative ride height sensor, e.g., for measuring a ride height of the first axle 12 and/or the second axle 22,
- at least one angle sensor, e.g., for measuring the first angle 14 and/or the second angle 24,
- at least one wheel speed sensor, e.g., for measuring rotational speed of the first wheel 15 and/or the second wheel 25,
- at least one drive shaft sensor, e.g., for measuring rotational speed of the first drive shaft 13 and/or the second drive shaft 23 and/or for measuring a current rotational angle of the first drive shaft 13 and/or the second drive shaft 23 around its respective center, and
- a positioning sensor, e.g., Global Navigation Satellite Systems (GNSS) such as Global Positioning System (GPS).

For some exemplary embodiments herein, any one or more rotational components of the vehicle 1 may have a sensor measuring its rotational angle, e.g., which sensor data may be used for any suitable example or embodiment herein.

Exemplary embodiments herein may be performed at least partly by a computer system 700, and/or a processor device 702 therein. The computer system 700 may be comprised in the vehicle 1, or may be comprised in a remote location communicatively coupled to the vehicle 1, e.g., in a server or control station e.g., which may be arranged to at least partly remotely control and/or to provide instructions such to the vehicle 1. The computer system 700 and/or the processor device 702 therein may further, directly or indirectly, control and/or communicate with any suitable entity comprised in the vehicle 1, e.g., sensors of the vehicle 1. The computer system 700 and/or the processor device 702 therein may further be able to select a candidate path for the first vehicle 1 to travel.

Figure 2:
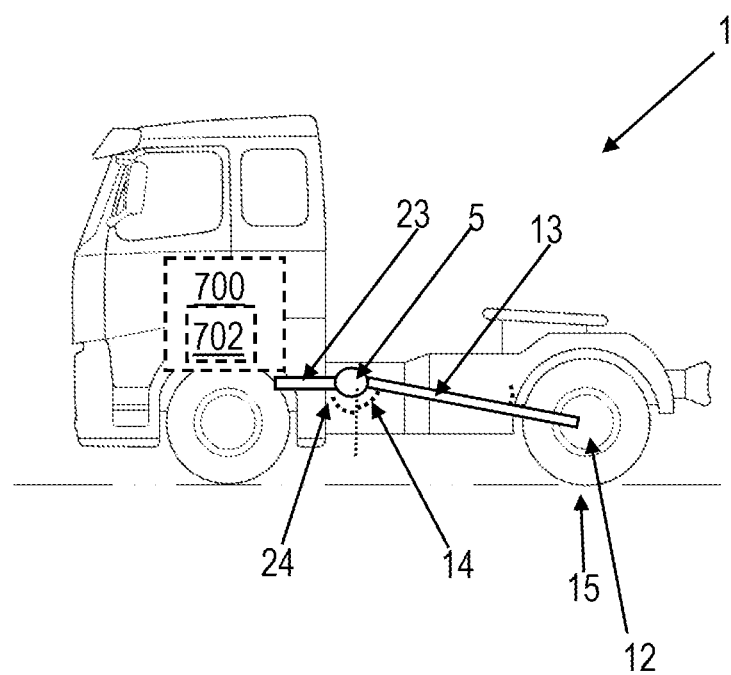
FIG. 2 is another view of FIG. 1, according to another example.

FIG. 2 is another view of FIG. 1, according to another example.

The computer system 700 comprising the processor device 702 is configured to adjust a torque applied to the first wheel 15 of the vehicle 1. The first wheel 15 is comprised in the first axle 12 drivingly connected to the first drive shaft 13. The first drive shaft 13 is configured to be driven by applying a torque to the second drive shaft 23. The second drive shaft 23 rotates the mechanical joint 5 based on the applied torque. The mechanical joint 5 is drivingly connected to both the first drive shaft 13 and the second drive shaft 23. The first drive shaft 13 is angled at a first angle 14 to the mechanical joint 5. The second drive shaft 23 is angled at a second angle 24 to the mechanical joint 5.

The processor device 702 is further configured to estimate, for a predetermined time period, a variation in rotational speed of the first drive shaft 13. The variation in rotational speed of the first drive shaft 13 is caused at least partially by the first angle 14 and the second angle 24.

The processor device 702 is further configured to, in response to obtaining an indication to adjust a slip of the first wheel 15, based on the estimated variation in rotational speed of the first drive shaft 13 and a current speed of the vehicle 1, estimate a target slip for the first wheel 15.

The processor device 702 is further configured to, based on the estimated target slip for the first wheel 15, adjust the torque applied to the first wheel 15 by issuing or adjusting a torque request for a torque to be applied to the second drive shaft 23.

Figure 3:
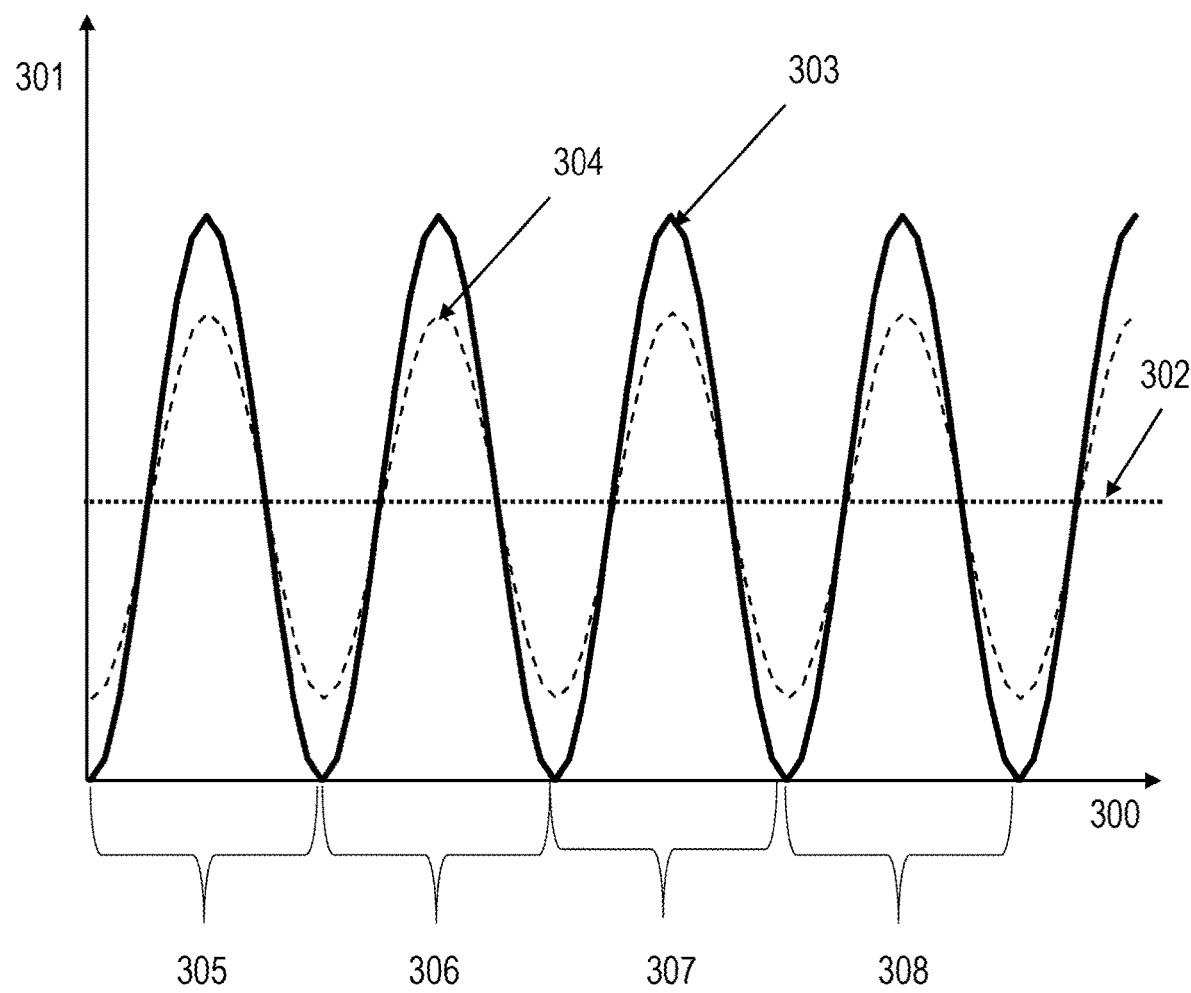
FIG. 3 is an exemplary illustration of variations in rotational speed of a drive shaft.

FIG. 3 is an exemplary illustration of variations in rotational speed of the first drive shaft 13 at different angles to the second drive shaft 23.

The Y-axis 301 illustrates a rotational speed of the first drive shaft 13, e.g., a shaft rotational speed in Revolutions Per Minute (RPM).

The X-axis 300 illustrates angular rotation of the second drive shaft 23 and/or the first drive shaft 13, i.e. as they have the same angular rotation, only the rotational speed will differ due to the mechanical joint 5.

The dotted line 302 represents the rotational speed of the second drive shaft 23, i.e. an input rotational speed to the mechanical joint 5 and/or the first drive shaft 13. The dotted line 302 would also represent the rotational speed of the first drive shaft 13 if the angle between the first drive shaft 13 and the second drive shaft 23 was exactly 180 degrees and/or if the mechanical joint 5 was a constant velocity joint, i.e. a joint which produces a same output rotational speed as an input rotational speed. However, the mechanical joint 5, e.g., typically a universal joint, produces a different output rotational speed for a set input rotational speed when there is an angle between the shafts different from 180 degrees.

The curve 303 represents the rotational speed of the first drive shaft 13 at a first angular configuration of the first drive shaft 13 and the second drive shaft 23.

The dashed curve 304 represents the rotational speed of the first drive shaft 13 at a second angular configuration of the first drive shaft 13 and the second drive shaft 23.

The curve 303 has an increased variation in rotational speed compared to the dashed curve 304. This is since in the first angular configuration, the angle formed between the first drive shaft 13 and the second drive shaft 23, e.g., 100 degrees, is closer to a 90 degree angle than in the second angular configuration, e.g., 120 degrees.

For a 180 degree angle formed between the first drive shaft 13 and the second drive shaft 23, no variation in rotational speed would occur. I.e., when the angle formed between the first drive shaft 13 and the second drive shaft 23 is closer to 180 degrees, a lower variation in rotational speed will occur.

To further illustrate the differences for some example angles:

1) As an example, for some configurations, when the angle formed between the first drive shaft 13 and the second drive shaft 23 is 100 degrees, a maximum increase and decrease in rotational speed of the first drive shaft 13 compared to the second drive shaft 23 may be 54 percent.
2) As another example, for some configurations, when the angle formed between the first drive shaft 13 and the second drive shaft 23 is 98 degrees, a maximum increase and decrease in rotational speed of the first drive shaft 13 compared to the second drive shaft 23 may be 2 percent.

The curve 303 and the dashed curve 304 varies over different phases.

For a first phase 305, the second drive shaft 23 is rotated from 0 to 90 degrees around e.g., clockwise or counter-clockwise around its own center. The rotation causes the mechanical joint 5 to rotate, which further causes the first drive shaft 13 to rotate. In the first phase 305, the rotational speed of the first drive shaft 13 is increasing for the curve 303 and the dashed curve 304.

For a second phase 306, the second drive shaft 23 is rotated from 90 degrees to 180 degrees around e.g., clockwise or counter-clockwise around its own center. The rotation causes the mechanical joint 5 to rotate, which further causes the first drive shaft 13 to rotate.

In the second phase 306, the rotational speed of the first drive shaft 13 is decreasing for the curve 303 and the dashed curve 304.

For a third phase 307, the second drive shaft 23 is rotated from 180 to 270 degrees around e.g., clockwise or counter-clockwise around its own center. The rotation causes the mechanical joint 5 to rotate, which further causes the first drive shaft 13 to rotate. In the third phase 307, the rotational speed of the first drive shaft 13 is increasing for the curve 303 and the dashed curve 304.

For a fourth phase 308, the second drive shaft 23 is rotated from 270 degrees to 360 degrees around e.g., clockwise or counter-clockwise around its own center, e.g., back to the 0 degrees as in the first phase 305. The rotation causes the mechanical joint 5 to rotate, which further causes the first drive shaft 13 to rotate. In the fourth phase 308, the rotational speed of the first drive shaft 13 is decreasing for the curve 303 and the dashed curve 304. After the fourth phase 308, the rotation of the first drive shaft 13 may iterate over the phases 305-308, e.g., and start again with the first phase 305, etc.

The first phase 305 to the fourth phase 308 corresponds to one revolution of the first drive shaft 13 and the second drive shaft 23 respectively.

As an example, the difference in rotational speed may as shown above, be different for different angles between the first drive shaft 13 and the second drive shaft 23.

In the above examples, the rotational angle of the second drive shaft 23, i.e. how many degrees the second drive shaft 23 is rotated around the center of the second drive shaft 23 is the same rotational angle as how many degreed the first drive shaft 13 is rotated around the center of the first drive shaft 13. In other words, the rotation of the first drive shaft 13 and the second drive shaft 23 is the same in terms of degrees in angles, but the rotational/angular speed is different for different angles.

In some examples, when the vehicle 1 comprises at least one drive shaft sensor, then the at least one drive shaft sensor may be configured to measure a current rotational angle of the first drive shaft 13 and/or the second drive shaft 23. In these examples, it may be possible to, based on the current rotational angle of the first drive shaft 13 and/or the second drive shaft 23, determine in which part of which phase the first drive shaft 13 and/or the second drive shaft 23 is presently in, and thereby, when estimating the target slip for the first wheel 15, it may be possible to predict and account for how the slip of the first wheel 15 will change.

Figure 4:
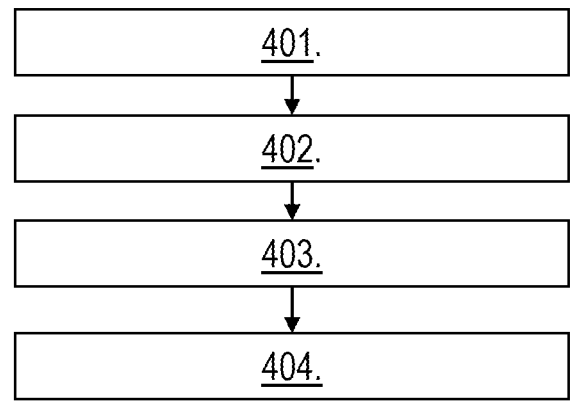
FIG. 4 is a flow chart of an exemplary method to estimate a ride height according to one example.

FIG. 4 is a flow chart of an exemplary computer-implemented method for adjusting a torque applied to the first wheel 15 of the vehicle 1. The first wheel 15 being comprised in the first axle 12 drivingly connected to a first drive shaft 13. Drivingly connected may mean that the first axle 12 and thereby the first wheel 15 is driven by the rotation of the first drive shaft 13. The first drive shaft 13 is configured to be driven by applying a torque to the second drive shaft 23. The second drive shaft 23 rotates the mechanical joint 5 based on the applied torque. The mechanical joint 5 being drivingly connected to both the first drive shaft 13 and the second drive shaft 23. This may mean that the when the second drive shaft 23 rotates, e.g., due to the applied torque, the second drive shaft 23 rotates the mechanical joint 5 which in turn rotates the first drive shaft 13. The first drive shaft 13 is angled at a first angle 14 to the mechanical joint 5. The second drive shaft 23 is angled at a second angle 24 to the mechanical joint 5. The first angle 14 and the second angle 24 may decide a variation in rotational speed of the first drive axle 13, and by extension, a variation in rotational speed of the first wheel 15.

The method may be performed by the computer system 700 and/or by the processor device 702 therein. The method may perform the following actions which may be taken in any suitable order.

Action 401.

The method comprises, by the processor device 702 of the computer system 700, estimating, for a predetermined time period, a variation in rotational speed of the first drive shaft 13. The variation in rotational speed of the first drive shaft 13 is caused at least partially by the first angle 14 and the second angle 24. This is since the property of the mechanical joint 5 causes the first drive shaft 13 to have a variation in rotational speed when being rotated by the second drive shaft 23 based on the first angle 14 and the second angle 24.

The variation in rotational speed of the first drive shaft 13 may be estimated using any suitable method, e.g., by measuring a rotational speed of the first drive shaft 13. The rotational speed of the first drive shaft 13 may be estimated based on a current rotational angle of the second drive shaft 23 around its own center, and/or based on a current rotational angle of the first drive shaft 13 around its own center. I.e., a current rotational speed of the first drive shaft 13 may be estimated based on its current amount of rotation, e.g., as illustrated by FIG. 3.

The predetermined time period may be any suitable time period for sampling the variation in rotational speed, e.g., 1 second, however, in some example scenarios the predetermined time periods is equivalent to one revolution of the second drive shaft 23.

For some examples, the first drive shaft 13 and/or the second drive shaft 23 spin at around 600-1200 RPM which corresponds to 10-20 revolutions per second. In such examples, the sampling rate for measuring the rotational speed and/or variation in rotational speed of the first drive shaft 13 and/or the second drive shaft 23 may be 100 Hz or higher.

The variation in rotational speed of the first drive shaft 13 may be obtained in many different ways, either by utilizing the relationship between the first angle 14 and/or the second angle 24 and the variation in rotational speed of the first drive axle 13, or by any other suitable method which will be explained.

The variation in rotational speed of the first drive shaft 13 may be obtained based on any suitable number of methods, e.g., to have redundancy, to verify that the obtained variation in rotational speed of the first drive shaft 13 is correct and/or to improve accuracy e.g., by using an average, medium or typical valued of different methods to obtain the variation in rotational speed of the first drive shaft 13.

In one example, obtaining the variation in rotational speed of the first drive shaft 13 may comprise obtaining the variation in rotational speed for the predetermined time period from a rotation sensor arranged to measure the rotational speed of the first drive shaft 13. The rotation sensor may be arranged in the vehicle 1, e.g., mounted on or in direct connection with the first drive shaft 13.

In one example, obtaining the variation in rotational speed of the first drive shaft 13 comprises obtaining from at least one angle sensor, the first angle 14 and the second angle 24, and estimating the variation in rotational speed of the first drive shaft 13 based on the first angle 14 and the second angle 24. The variation in rotational speed of the first drive shaft 13 may be estimated e.g., by mapping the first angle 14 and the second angle 24 to the variation in rotational speed of the first drive shaft 13.

In one example, obtaining the variation in rotational speed of the first drive shaft 13 comprises obtaining a ride height of the first axle 12, and obtaining a ride height of the second axle 22. The ride height of the second axle 22 at least partly determines the second angle 24. In these examples, obtaining the variation in rotational speed of the first drive shaft 13 comprises estimating the variation in rotational speed of the first drive shaft 13 based on the difference in ride height between the first axle 12 and the second axle 22, e.g., by any one or more out of:

by deriving the first angle 14 and/or the second angle 24 and e.g., by mapping the first angle 14 and the second angle 24 to the variation in rotational speed of the first drive shaft 13, and by mapping the difference in ride height to the variation in rotational speed of the first drive shaft 13.

In one example, obtaining the variation in rotational speed of the first drive shaft 13 comprises obtaining a first wheel speed of the first wheel 15 of the first axle 12, obtaining a second wheel speed of a second wheel 25 of a second axle 22, wherein a ride height of the second axle 22 at least partly determines the second angle 24, and estimating the variation in rotational speed of the first drive shaft 13 by comparing the first wheel speed and the second wheel speed during the predetermined time period.

Wheel speed as used herein may be the respective rotational speed of the respective first wheel 15 and second wheel 25. The comparison of the first wheel speed and the second wheel speed during the predetermined time period may be mapped to the variation in rotational speed of the first drive shaft 13, e.g., based on heuristics and/or a predefined model, such as a machine learning model. Such a predefined model and/or machine learning model may be trained using the wheel speeds of the first wheel 15 and the second wheel 25 combined with a value for the variation in rotational speed of the first drive shaft 13 as a ground truth, e.g., by using a drive shaft sensor measuring the first drive shaft rotational speed and/or variation in rotational speed during a training phase of the predefined model and/or machine learning model.

In some examples, obtaining the variation in rotational speed of the first drive shaft 13 comprises predicting a variation in rotational speed of the first drive shaft 13 by using a predetermined statistical model modelling the rotational speed of the first drive shaft 13, and as an input to the predetermined statistical model, one or more out of the following one or more parameters are provided:

an indication of a current requested and/or applied throttle parameter of the vehicle 1, an indication of a current requested and/or applied brake parameter of the vehicle 1, an indication of a current requested and/or applied speed parameter of the vehicle 1, an indication of a current requested and/or applied suspension parameter of the vehicle 1, an indication of loads applied to the first axle 12 and/or the second axle 22 of the vehicle 1.

The above mentioned one or more parameters may for example determine at least partly a longitudinal motion of the vehicle 1, which in combination or individually, may indicate the ride height difference of the first axle 12 and the second axle 22, which thus, by the use of the predetermined statistical model, makes the variation in rotational speed of the first drive shaft 13 derivable from the one or more parameters. The predetermined statistical model may be a machine learning model trained using one or more training parameters combined with a value for the variation in rotational speed of the first drive shaft 13 as a ground truth, e.g., by using a drive shaft sensor measuring the first drive shafts rotational speed and/or variation in rotational speed during a training phase.

Action 402.

The method comprises, obtaining an indication to adjust a slip of the first wheel 15. The indication may be a signal sent to the computer system 700 and/or processor device 702 therein, e.g., from any control unit in the vehicle 1.

In some examples, the obtained indication indicates any one or more out of:

to initiate a stability control procedure, to initiate a traction control procedure, and to initiate an auxiliary brake control procedure.

The obtained indication may indicate to initiate a stability control procedure, e.g., as a response to detecting roll or yaw values or rates of the vehicle to exceed a threshold.

The obtained indication may indicate to initiate a traction control procedure, e.g., as a response to detecting a wheel slip of the first wheel 15 to exceed a threshold.

The obtained indication may indicate to initiate an auxiliary brake control response, e.g., as a response to detecting a request for auxiliary brake braking, e.g., by the request indicating using brake blending or by obtaining the request from an auxiliary brake user interface such as from detecting a stalk being placed in a set discrete position or by detecting a button being pressed.

Action 403.

The method comprises, by the processor device 702, in response to obtaining the indication to adjust a slip of the first wheel 15, estimating a target slip for the first wheel 15 based on the estimated variation in rotational speed of the first drive shaft 13 and a current speed of the vehicle 1.

The target slip may be a longitudinal wheel slip of the first wheel 15, wherein the longitudinal wheel slip of the first wheel 15 accounts for the variation of the rotational speed of the first drive axle 13 which further affects the rotational speed of the first wheel 15.

In some examples, estimating the target slip for the first wheel 15 comprises obtaining a current rotational speed of the first wheel 15, and obtaining the current speed of the vehicle 1. In these examples, estimating the target slip for the first wheel 15 comprises estimating a linear target slip based at least partly on a comparison of the current rotational speed of the first wheel 15 and the speed of the vehicle 1, i.e., as if assuming no variation in the rotational speed of the first drive shaft 13. In these examples, estimating the target slip for the first wheel 15 comprises estimating the target slip by adjusting the linear target slip based on the estimated variation in rotational speed of the first wheel 15. Adjusting the linear target slip based on the estimated variation in rotational speed of the first wheel 15 may comprise predicting the future rotational speed of the first wheel 15 based on the variation in the rotational speed of the first drive shaft 13, e.g., based on a current rotational angle of the first drive shaft 13 and/or a current rotational angle of the second drive shaft 23, e.g., as obtained from a drive shaft sensor of the vehicle 1.

The speed of the vehicle 1 may be obtained in any suitable manner, e.g., by a speedometer of the vehicle 1, by measuring or estimating a rotational speed of a non-driven wheel e.g., the second wheel 25, by use of positioning the vehicle using GPS at two different times, by using an Inertial Measurement Unit possibly filtered using a Kalman filter, etc.

When measuring the speed of the vehicle 1 by using measuring or estimating the rotational speed of the non-driven wheel, e.g., the second wheel 25, it may be assumed or may need to be detected that a slip of the non-driven wheel is below a threshold. Slip in non-driven wheels may typically happen during braking, and hence, as one example, using the rotational speed of the non-driven wheel to measure the speed of the vehicle 1 may in some examples happen in response to detecting that the vehicle 1 is not braking.

Purely by way of example, a parameter sL indicative of a slip in a longitudinal direction L of the first wheel 15 may, without accounting for the variation in rotational speed of the first drive shaft 13, be defined in accordance with the following Equation (1):

$$s_L = \frac{R\omega - v_L}{|R\omega|}$$

where R denotes a radius of the first wheel 15, ω denotes an angular velocity of the first wheel 15 and vL denotes a longitudinal speed of the first wheel 15, which longitudinal speed generally is related to the longitudinal speed of the center of the first wheel 15.

In some examples, Equation (1) may be used for estimating the target slip if the Equation (1) is modified such that the angular velocity ω accounts for the future variation in rotational speed of the first wheel 15.

For exemplary embodiments herein, a vehicle speed of the vehicle 1 may be estimated and/or measured in any suitable manner.

Action 404.

The method comprises, based on the estimated target slip for the first wheel 15, adjusting the torque applied to the first wheel 15 by issuing or adjusting a torque request for a torque to be applied to the second drive shaft 23.

In other words, the torque applied to the first wheel 15 will be adapted based on the variation in rotational speed of the first drive axle 13.

As the target slip is estimated, e.g., as in action 403, at least partly based on the variation in rotational speed of the first drive shaft 13, the torque will be more optimally requested/adjusted to match the variation of the first drive shaft 13 which results in a variation in wheel speed of the first wheel 15. Examples herein may better match a torque to the estimated target slip compared to if assuming no variation in rotational speed of the first drive shaft 13.

In some examples, adjusting the torque applied to the first wheel 15 by issuing or adjusting a torque request for a torque to be applied to the second drive shaft 23 comprises determining a required rotational speed of the second drive shaft 23 based on the estimated target slip for the first wheel 15. In these examples, determining the required rotational speed of the second drive shaft 23 may be based on any one or more out of the estimated variation in rotational speed of the first drive shaft 13, and the first angle 14 and the second angle 24. In these examples, when issuing or adjusting the torque request for the torque to be applied to the second drive shaft 23 is based on converting the required rotational speed of the second drive shaft 23 to the torque to be issued or adjusted for the second drive shaft 23.

In other words, in some examples, adjusting the torque applied to the first wheel 15 may comprise calculate the wheel speed of the first wheel 15 which is needed to achieve the estimated target slip based on the vehicle speed at a first time t1, and further estimate what the wheel speed of the first wheel 15 would be at a second time t2 and a required wheel speed to achieve the estimated target slip. Adjusting the torque applied to the first wheel 15 may then comprise, based on the required wheel speed, calculating a required rotational speed of the second drive shaft 23, to achieve a rotational speed of the first drive shaft 13 which matches the required wheel speed of the first wheel 15. Calculating a required rotational speed of the second drive shaft 23, may use the first angle 14, the second angle 24, and/or the rotational angle of the first drive shaft 13 and/or the second drive shaft 23 to estimate the variation of rotational speed and/or the future rotational speed, e.g., between and during the first and second time t1 and t2, of the first drive shaft 13. In this way the rotational speed of the second drive shaft 23 may be calculated such that the calculated rotation of the second drive shaft 23 will rotate the first drive shaft 13 with a rotational speed that drives the first wheel 15 at the required wheel speed which will achieve the estimated target slip. The calculated rotational speed of the second drive shaft 23 may further be converted to an engine speed based on gear train configurations of the vehicle. To achieve the engine speed, adjusting the torque applied to the first wheel 15 may comprise issuing or adjusting the torque request to correspond to the converted engine speed and e.g., sent to an engine/motor ECU of the vehicle 1.

In some examples, adjusting the torque applied to the first wheel 15 by issuing or adjusting the torque request for the torque to be applied to the second drive shaft 23 comprises iteratively estimating a target slip for the first wheel 15 based on the variation in rotational speed and a speed of the vehicle 1. In these examples, adjusting the torque applied to the first wheel 15 further comprises adjusting the torque applied to the first wheel 15 by issuing or adjusting the torque request to the second drive shaft 23 based on the iteratively estimated target slip until the iteratively estimated target slip is below a threshold and/or until detecting that a condition associated with the obtained indication has ceased, e.g., as in action 402. In other words, either the estimated target slip is reached, or at least reached within the threshold, or the reason for achieving the estimated target slip has ceased, i.e., no ongoing stability control procedure, no ongoing traction control procedure, and no ongoing auxiliary brake control procedure.

Figure 5:
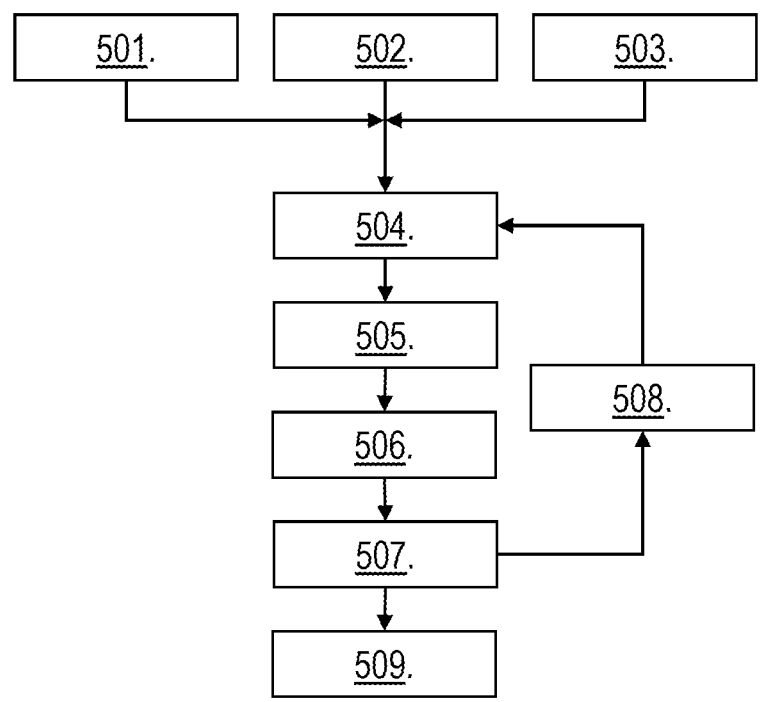
FIG. 5 is a flow chart illustrating an example scenario.

FIG. 5 illustrates an example scenario according to one example.

The flow for a control strategy may start from any one of the following, e.g., as indicated in action 402:

501. For Stability Control—Any Electronic Stability Program (ESP) e.g., vehicle stability control, vehicle disturbance, If there is a Yaw or Roll beyond accepted value.
502. For Traction Control—Wheel slip beyond threshold or limits during traction events
503. For Aux Brake Control—If the driver requests for Aux brake via brake blending (using foot brake) or Aux brake lever/stalk directly The input from any one of 501-503 may be fed 504 into a vehicle reference model for the vehicle 1 to achieve a current state of the vehicle. The input from any one of 501-503 may be fed into the vehicle reference model along with data from state estimators and/or sensors providing an accurate dynamic state of the vehicle 1, e.g., a current rotational angle of the first drive shaft 13 and/or the second drive shaft 23 and/or a variation in rotational speed of the first drive shaft 13, e.g., as obtained in action 401. Using the current state of the vehicle 1, a controller, e.g., the computer system 700 and/or the processor device 702 therein may estimate 505 a target slip, e.g., as in action 403, and further to adjust 506 the torque applied to the first wheel 15, e.g., as in action 404, to stabilize the vehicle 1, for stability control 501, improve traction capability for traction control 502 and/or improve braking performance, for aux brake control 503.

The example scenario may further comprise checking 507 whether the condition of any of 501-503 still exists after actions 505-506, if so then the procedure of the example scenario would continue by feeding back 508 a new current state of the vehicle 1 back to the vehicle reference model to continue actions 505-506. The new current state of the vehicle 1 may comprise data from state estimators and/or sensors providing an accurate dynamic state of the vehicle 1, e.g., a current rotational angle of the first drive shaft 13 and/or the second drive shaft 23 and/or a variation in rotational speed of the first drive shaft 13, e.g., as obtained in action 401.

the loop will continue as shown in the diagram. If not, it would cancel the torque request and exit the control strategy.

If the condition of any of 501-503 does not exist after actions 505-506, no torque adjustment will be made.

Figure 6:
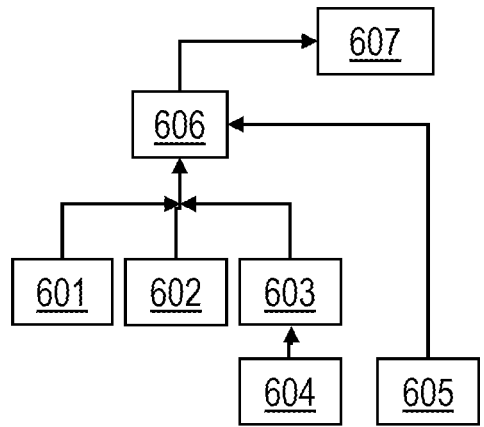
FIG. 6 is a flow chart illustrating an example scenario.

FIG. 6 illustrates an example scenario according to one example.

There may be three options, e.g., combinable, for providing a source of an estimated variation of the rotational speed of the first drive shaft 13, e.g., as in action 401, as listed below:

Angle sensor 601—The angle sensor 601 may provide the angle between the output and input shaft, e.g., the first angle 14 and the second angle 24. Estimating the variation in rotational speed may be performed by the use of mapping the angle from the angle sensor 602 to the variation in rotational speed of the first drive shaft 13, e.g., by the use of a lookup table.

Axle ride height sensor 602—The axle ride height sensor 602 provides a ride height of the first axle 12, which may be mapped to a predefined angle of the first angle 14. In these scenarios, the ride height of the second axle 22 and/or the second angle 24 may be predefined, e.g., as the vehicle 1 may be in a cruise control with a known ride height of the second axle 22, typically when the second axle 22 is the front axle of the vehicle 1. In these scenarios, there may be one or more, e.g., two, lookup tables used. A first lookup table may convert or map the ride height of the first axle 12 to the first angle 14. The second lookup table may be used to convert or map the first angle 14 and the second angle 24 to the variation in rotational speed of the first drive shaft 13.

Machine learning model 603—In some scenarios, the machine learning model 603 may be trained, e.g., using a conventional deep neural network or a Support Vector Machine (SVM) to estimate the variation in rotational speed of the first drive shaft 13 based on one or more Controller Area Network (CAN) inputs 604 such as brake, throttle, speed, suspension setup, load on the respective axles, etc. The one or more CAN inputs may be the one or more parameters of actions 401. The machine learning model may be trained on training CAN inputs and a ground truth for the variation in the rotational speed of the first drive shaft 13, e.g., based on a drive shaft sensor mounted on the first drive shaft 13. Additionally or alternatively, the machine learning model 603 may be used to estimate the first angle 14 and/or the second angle 24. The first angle 14 and/or the second angle 24 may then be mapped to the variation in the rotational speed of the first drive shaft 13. The first angle 14 and/or the second angle 24 may be mapped to the variation in the rotational speed of the first drive shaft 13 together with a ride height of the first axle 12 and/or the second axle 22. The ride height of the first axle 12 and/or the second axle 22 may be predetermined, e.g., when the vehicle 1 is in a cruise control mode, or measured by any suitable method. In these scenarios The machine learning model may be trained on training CAN inputs and a ground truth for the first angle 14 and/or the second angle 24, e.g., based on the angle sensor 601.

This estimated variation of the rotational speed of the first drive shaft 13 from any one or more out of blocks 601-603 may be passed on to a state estimator block 606 where actual sensor data 605 is feedback and combined with the estimated variation of the rotational speed of the first drive shaft 13.

A vehicle reference model, e.g., the vehicle reference model also referenced with respect to FIG. 5, is now made aware about the current fluctuation happening at t=0 and is proposing a target slip to control the estimated variation of the rotational speed of the first drive shaft 13 e.g., using a Proportional-Integral-Derivative (PID) controller or a Proportional-Integral (PI) controller.

A proposed controller 607 of exemplary embodiments herein, e.g., as part of the computer system 700, may now be configured to compare what is a current expected rotational speed of the drive shaft 13, and configured to add or remove wheel speed of the first wheel 15 based on the estimated variation in rotational speed of the drive shaft 13, e.g., as in actions 403-404.

The current expected rotational speed of the drive shaft 13, may be iteratively estimated by the controller 607 based on the estimated variation in rotational speed of the first drive shaft 13, and/or may be derived based on an obtained rotational angle of the first drive shaft 13 and/or an obtained rotational angle of the second drive shaft 23, e.g., by utilizing that different phases of revolution of the of the first drive shaft 13 and/or the second drive shaft 23 causes different rotational speeds of the first drive shaft 13, e.g., as illustrated in FIG. 3.

The adding or removing of wheel speed may in some scenarios be performed if the vehicle speed has not already been compensated for after a set period of time. The period of time may be shorter than a threshold, e.g., 1-10 milliseconds.

Figure 7:
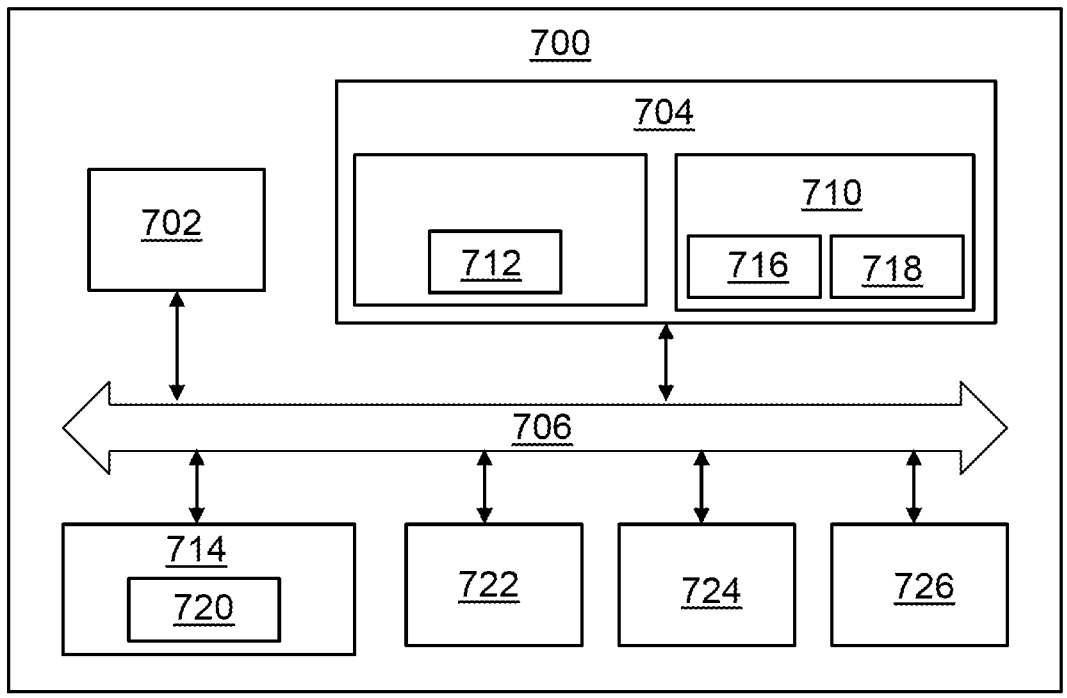
FIG. 7 is a schematic diagram of an exemplary computer system for implementing examples disclosed herein, according to one example.

FIG. 7 is a schematic diagram of the computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN, an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include the processor device 702 (may also be referred to as a control unit), a memory 704, and a system bus 706. The computer system 700 may include at least one computing device having the processor device 702. The system bus 706 provides an interface for system components including, but not limited to, the memory 704 and the processor device 702. The processor device 702 may include any number of hardware components for conducting data or signal processing or for executing computer code stored in memory 704. The processor device 702 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processor device 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with a processor device 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program product 720 stored on a transitory or non-transitory computer-usable or computer-readable storage medium (e.g., single medium or multiple media), such as the storage device 714, which includes complex programming instructions (e.g., complex computer-readable program code) to cause the processor device 702 to carry out the steps described herein. Thus, the computer-readable program code can comprise software instructions for implementing the functionality of the examples described herein when executed by the processor device 702. The processor device 702 may serve as a controller or control system for the computer system 700 that is to implement the functionality described herein.

The computer system 700 also may include an input device interface 722 (e.g., input device interface and/or output device interface). The input device interface 722 may be configured to receive input and selections to be communicated to the computer system 700 when executing instructions, such as from a keyboard, mouse, touch-sensitive surface, etc. Such input devices may be connected to the processor device 702 through the input device interface 722 coupled to the system bus 706 but can be connected through other interfaces such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may also include a communications interface 726 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising a processor device configured to adjust a torque applied to a first wheel of a vehicle, the first wheel being comprised in a first axle drivingly connected to a first drive shaft, the first drive shaft being configured to be driven by applying a torque to a second drive shaft, wherein the second drive shaft rotates a mechanical joint based on the applied torque, the mechanical joint being drivingly connected to both the first drive shaft and the second drive shaft, wherein the first drive shaft is angled at a first angle to the mechanical joint, and wherein the second drive shaft is angled at a second angle to the mechanical joint, the processor device further being configured to:
- estimate, for a predetermined time period, a variation in rotational speed of the first drive shaft, the variation in rotational speed of the first drive shaft being caused at least partially by the first angle and the second angle,
- in response to obtaining an indication to adjust a slip of the first wheel, based on the estimated variation in rotational speed of the first drive shaft and a current speed of the vehicle, estimate a target slip for the first wheel, and
- based on the estimated target slip for the first wheel, adjust the torque applied to the first wheel by issuing or adjusting a torque request for a torque to be applied to the second drive shaft.

2. A computer-implemented method for adjusting a torque applied to a first wheel of a vehicle, the first wheel being comprised in a first axle drivingly connected to a first drive shaft, the first drive shaft being configured to be driven by applying a torque to a second drive shaft, wherein the second drive shaft rotates a mechanical joint based on the applied torque, the mechanical joint being drivingly connected to both the first drive shaft and the second drive shaft, wherein the first drive shaft is angled at a first angle to the mechanical joint, and wherein the second drive shaft is angled at a second angle to the mechanical joint, the method further comprising:
- by a processor device of a computer system, estimating, for a predetermined time period, a variation in rotational speed of the first drive shaft, the variation in rotational speed of the first drive shaft being caused at least partially by the first angle and the second angle,
- by the processor device, in response to obtaining an indication to adjust a slip of the first wheel, based on the estimated variation in rotational speed of the first drive shaft and a current speed of the vehicle, estimating a target slip for the first wheel, and
- based on the estimated target slip for the first wheel, adjusting the torque applied to the first wheel by issuing or adjusting a torque request for a torque to be applied to the second drive shaft.

3. The method of claim 2, wherein obtaining the variation in rotational speed of the first drive shaft comprises obtaining the variation in rotational speed for the predetermined time period from a rotation sensor arranged to measure the rotational speed of the first drive shaft.

4. The method of claim 2, wherein obtaining the variation in rotational speed of the first drive shaft comprises:
- obtaining from at least one angle sensor, the first angle and the second angle, and
- estimating the variation in rotational speed of the first drive shaft based on the first angle and the second angle.

5. The method of claim 3, wherein obtaining the variation in rotational speed of the first drive shaft comprises:
- obtaining a ride height of the first axle,
- obtaining a ride height of a second axle, wherein the ride height of the second axle at least partly determines the second angle, and
- estimating the variation in rotational speed of the first drive shaft based on the difference in ride height between the first axle and the second axle.

6. The method of claim 2, wherein obtaining the variation in rotational speed of the first drive shaft comprises:
- obtaining a first wheel speed of the first wheel of the first axle,
- obtaining a second wheel speed of a second wheel of a second axle, wherein a ride height of the second axle at least partly determines the second angle, and
- estimating the variation in rotational speed of the first drive shaft by comparing the first wheel speed and the second wheel speed during the predetermined time period.

7. The method of claim 2, wherein obtaining the variation in rotational speed of the first drive shaft comprises:
- predicting a variation in rotational speed of the first drive shaft by using a predetermined statistical model modelling the rotational speed of the first drive shaft, and as an input to the predetermined statistical model, one or more out of the following one or more parameters are provided:
  - an indication of a current requested and/or applied throttle parameter of the vehicle,
  - an indication of a current requested and/or applied brake parameter of the vehicle,
  - an indication of a current requested and/or applied speed parameter of the vehicle,
  - an indication of a current requested and/or applied suspension parameter of the vehicle,
  - an indication of loads applied to the first axle and/or the second axle of the vehicle.

8. The method of claim 2, wherein adjusting the torque applied to the first wheel by issuing or adjusting a torque request for a torque to be applied to the second drive shaft comprises:
- based on the estimated target slip for the first wheel, determining a required rotational speed of the second drive shaft, wherein determining the required rotational speed of the second drive shaft is based on any one or more out of:
  - the estimated variation in rotational speed of the first drive shaft, and
  - the first angle and the second angle; and
- wherein issuing or adjusting the torque request for the torque to be applied to the second drive shaft is based on converting the required rotational speed of the second drive shaft to the torque to be issued or adjusted for the second drive shaft.

9. The method of claim 2, wherein estimating the target slip for the first wheel comprises:
- obtaining a current rotational speed of the first wheel,
- obtaining the current speed of the vehicle,
- estimating a linear target slip based at least partly on a comparison of the current rotational speed of the first wheel and the speed of the vehicle, and
- estimating the target slip by adjusting the linear target slip based on the estimated variation in rotational speed of the first wheel.

10. The method of claim 2, wherein adjusting the torque applied to the first wheel by issuing or adjusting the torque request for the torque to be applied to the second drive shaft comprises iteratively estimating a target slip for the first wheel based on the variation in rotational speed and a speed of the vehicle, and adjusting the torque applied to the first wheel by issuing or adjusting the torque request to the second drive shaft based on the iteratively estimated target slip until the iteratively estimated target slip is below a threshold and/or until detecting that a condition associated with the obtained indication has ceased.

11. The method of claim 2, wherein the obtained indication indicates any one or more out of: to initiate a stability control procedure, to initiate a traction control procedure, to initiate an auxiliary brake control procedure.

12. A vehicle comprising a computer system to perform the method of claim 2.

13. A computer program product comprising program code for performing, when executed by the processor device, the method of claim 2.

14. A control system comprising one or more control units configured to perform the method of claim 2.

15. A non-transitory computer-readable storage medium comprising instructions, which when executed by the processor device, cause the processor device to perform the method of claim 2.

* * * * *